United States Patent [19]
Rabowsky

[11] Patent Number: 6,141,530
[45] Date of Patent: Oct. 31, 2000

[54] SYSTEM AND METHOD FOR DIGITAL ELECTRONIC CINEMA DELIVERY

[75] Inventor: Irving Rabowsky, Woodland hills, Calif.

[73] Assignee: Digital Electronic Cinema, Inc., Los Angeles, Calif.

[21] Appl. No.: 09/094,615

[22] Filed: Jun. 15, 1998

[51] Int. Cl.[7] ................................................... H04H 1/00
[52] U.S. Cl. ............................ 455/3.1; 455/4.1; 455/4.2; 709/217; 348/7; 348/12; 348/13; 348/436
[58] Field of Search ..................... 455/3.1, 4.2; 709/217; 348/436, 13

[56] References Cited

U.S. PATENT DOCUMENTS

| | | | |
|---|---|---|---|
| 5,133,079 | 7/1992 | Ballantyne et al. | 455/4.1 |
| 5,412,416 | 5/1995 | Nemirofsky | 348/10 |
| 5,515,107 | 5/1996 | Chiang et al. | 348/473 |
| 5,519,435 | 5/1996 | Anderson | 348/8 |
| 5,546,118 | 8/1996 | Ido . | |
| 5,583,562 | 12/1996 | Birch et al. | 348/12 |
| 5,696,560 | 12/1997 | Songer | 348/436 |
| 5,729,279 | 3/1998 | Fuller | 348/8 |
| 5,795,046 | 8/1998 | Woo | 353/69 |
| 5,801,754 | 9/1998 | Ruybal et al. | 348/13 |
| 5,828,403 | 10/1998 | DeRodeff et al. | 348/7 |
| 5,920,626 | 7/1999 | Durden et al. | 380/10 |
| 5,924,013 | 7/1999 | Guido et al. | 455/3.1 |
| 5,924,039 | 7/1999 | Hugenberg et al. | 455/454 |

FOREIGN PATENT DOCUMENTS

| | | |
|---|---|---|
| 0554724A1 | 8/1993 | European Pat. Off. . |
| 0884908A2 | 12/1998 | European Pat. Off. . |
| WO95/26103 | 9/1995 | WIPO . |

*Primary Examiner*—Andrew I. Faile
*Assistant Examiner*—Sam Huang
*Attorney, Agent, or Firm*—Oppenheimer Wolff & Donnelly, LLP.

[57] ABSTRACT

A novel system and method for secure electronic delivery of motion pictures in digital format to many end users simultaneously. In particular, the system comprises a headend system and a theater system. The headend system comprises a baseband processing system which receives analog cinema film as input, a storage system which receives digitized cinema files from the baseband processing system, a radio frequency transmission system which communicates cinema and data files to and from various users as a radio frequency bit stream, and a management system which controls transmission and storage of cinema and data files. The theater system comprises transmission line interfaces at theaters designated to receive cinema and data files from the headend system, receiver-decoders which receive the radio frequency bit stream and produce decoded cinema and data files at baseband, storage playback systems which stores cinema and data files until needed, secure projector systems which playback cinema files, an automation/scheduling system which directs playback of cinema files in the secure projector systems as authorized by the management system, and a reverse channel which provides data back to the headend system from the theaters. A preferred version of the present invention further comprises a creator/editor's system which allows authorized viewing and editing of cinema files by creators and editors. The creator/editor's system provides capability for editing and baseband processing of cinema files at remote locations, and transmits edited cinema files back to the headend system.

5 Claims, 4 Drawing Sheets

Theater

Tiling Arrangement for Projector System

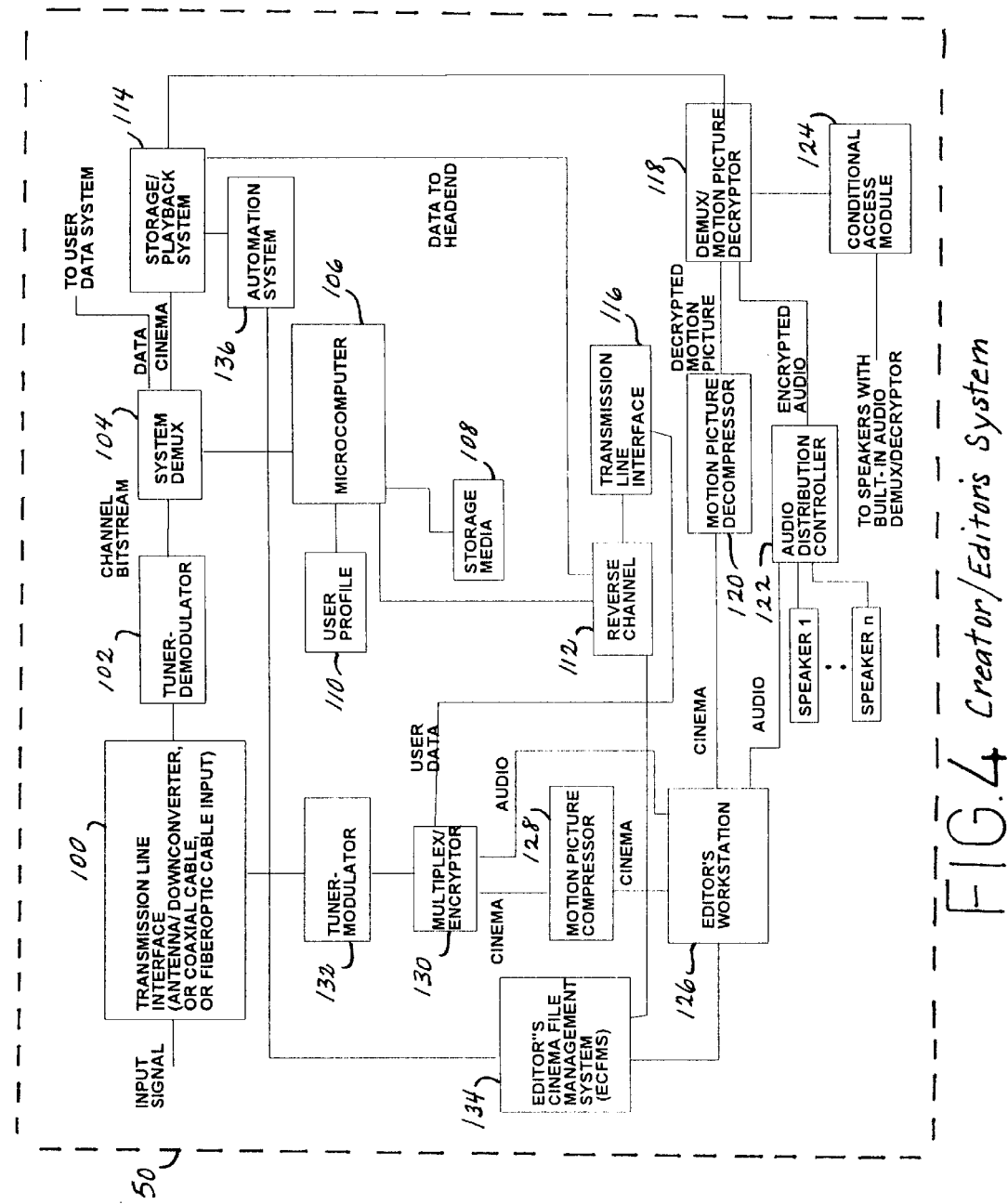
FIG. 4 Creator/Editor's System

SYSTEM AND METHOD FOR DIGITAL ELECTRONIC CINEMA DELIVERY

BACKGROUND OF THE INVENTION

1. Field of the Invention

This invention concerns delivery of motion pictures for exhibition. Specifically, this invention relates to a system and method for secure electronic delivery of motion pictures in digital format to many end users simultaneously.

2. Description of the Related Art

The current method of delivery of motion pictures for exhibition is to take the original film negative and make duplicate film prints in quantity sufficient to meet the schedule of exhibition. For each motion picture there are potentially many thousands of exhibitors worldwide. After many prints are made, they are distributed to the exhibitors via transportation means such as trucks. Each print is then installed into an optical-mechanical film projector which displays the print on a movie screen.

This conventional delivery method suffers from several disadvantages. First, there are many opportunities for piracy (unauthorized copying) due to the fact that many prints are made and distributed, and the film owner has, as a practical matter, little control over the prints after they are distributed. Second, the prints are expensive to make as they require costly photochemical lab processes and print stock. Third, conventional transportation means such as trucks are expensive, and may require several days or even weeks to complete a delivery cycle. Fourth, keeping track of the prints is extremely burdensome. Fifth, editing of the film after release is costly due to the cost of making new additional prints, and the logistics of distribution. By contrast, digital electronic cinema files are easily edited using computer technology. In addition, a digital electronic cinema may be customized to audience preferences, be provided in several versions with different MPAA ratings, and restricted geographically or by other criteria.

What is needed is a technology focused on the of delivery of motion pictures to theaters electronically, completely changing the delivery system presently employed by the motion picture industry from its present photochemical-mechanical technology to an entirely new digital electronic technology.

SUMMARY OF THE INVENTION

The present invention satisfies this need by providing studio distribution/exhibition and ancillary markets with a complete end-to-end integrated delivery/display system for secure digital electronic cinema. In particular, the system of the present invention comprises a headend system and a theater system. The headend system comprises a baseband processing system which receives analog cinema film as input, a storage system which receives digitized cinema files from the baseband processing system, a radio frequency transmission system which communicates cinema and data files to and from various users as a radio frequency bit stream, and a management system which controls transmission and storage of cinema and data files.

The theater system comprises transmission line interfaces at theaters designated to receive cinema and data files from the headend system, receiver-decoders which receive the radio frequency bit stream and produce decoded cinema and data files at baseband, storage playback systems which stores cinema and data files until needed, secure projector systems which playback cinema files, an automation/scheduling system which directs playback of cinema files in the secure projector systems as authorized by the management system, and a reverse channel which provides data back to the headend system from the theaters.

A preferred version of the present invention further comprises a creator/editor's system which allows authorized viewing and editing of cinema files by creators and editors. The creator/editor's system provides capability for editing and baseband processing of cinema files at remote locations, and transmits edited cinema files back to the headend system.

BRIEF DESCRIPTION OF THE DRAWINGS

FIG. 4 is a block diagram of a preferred version of a creator/editor's system embodying the present invention.

DETAILED DESCRIPTION OF THE INVENTION

Figure 1:
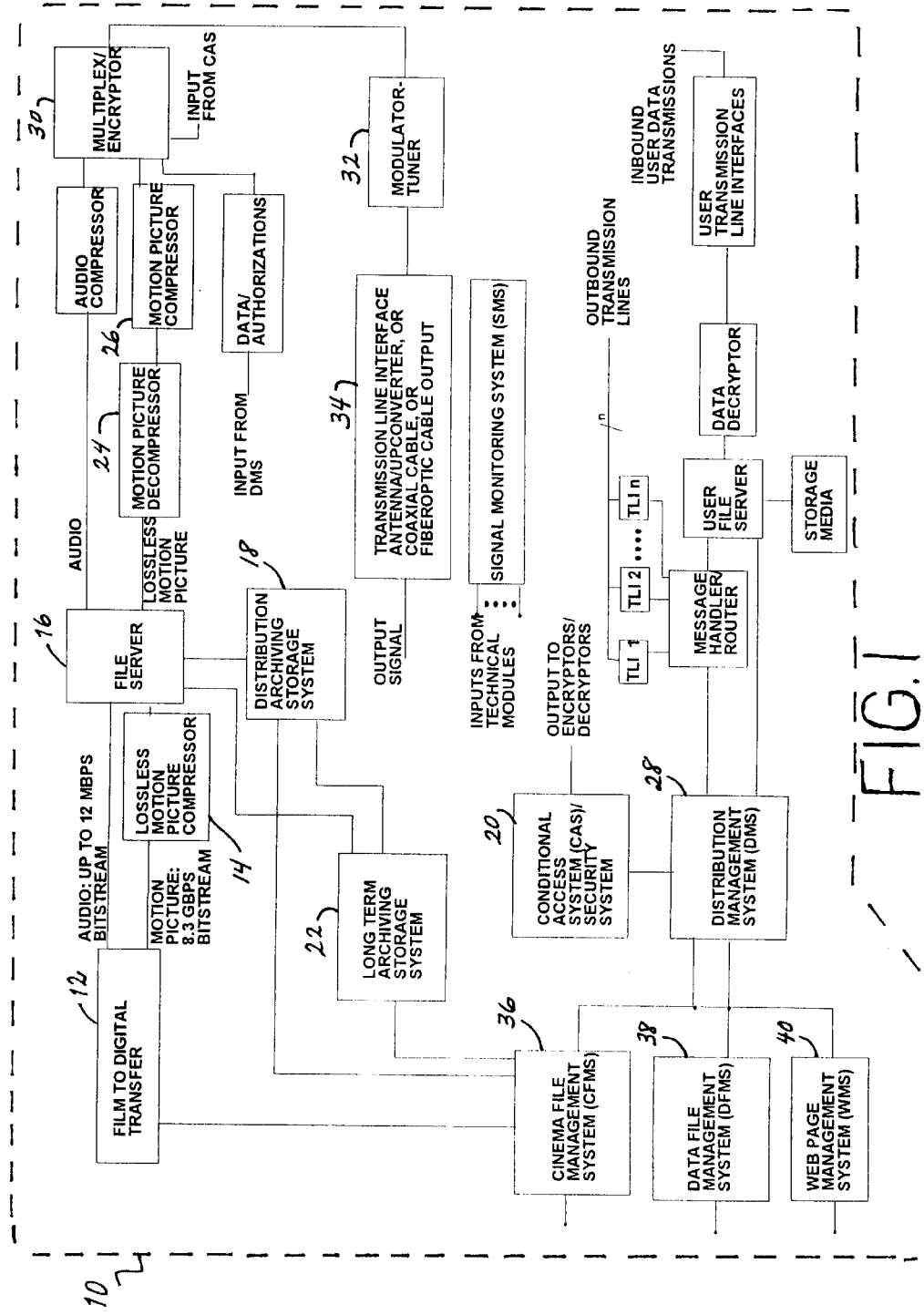
FIG. 1 is a block diagram of a preferred version of a headend system embodying the present invention.
Figure 2:
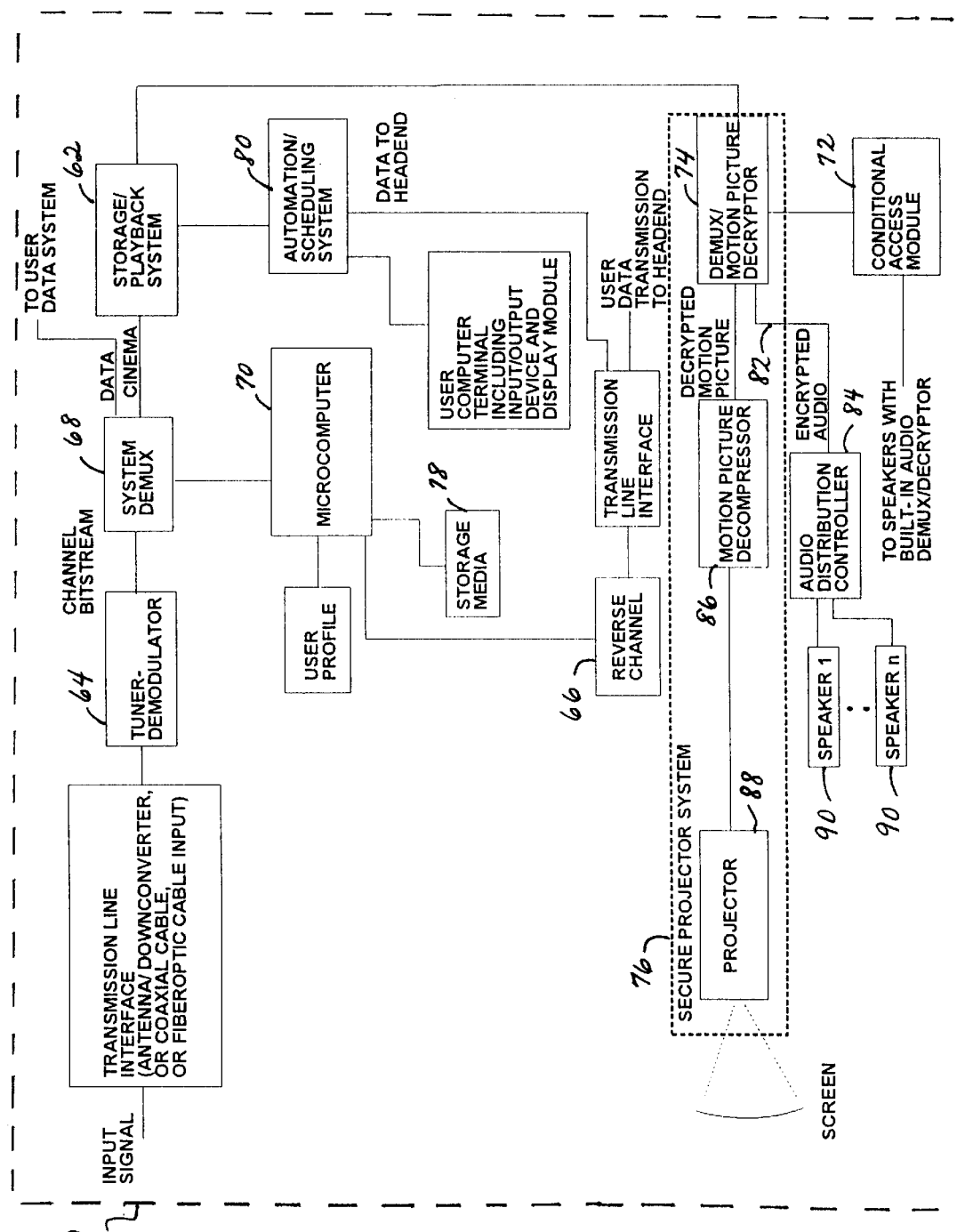
FIG. 2 is a block diagram of a preferred version of a theater system embodying the present invention.

The overall system architecture of the present invention comprises three main systems. Referring to FIG. 1, the first system is the Headend System, which performs baseband processing and storage of digitized cinema files, radio frequency transmission of cinema and data files to various users, and management of cinema files and databases. Referring to FIG. 2, the second system is the Theater System, which comprises transmission line interfaces at theaters designated to receive cinema and data files, receiver-decoders, storage playback systems, secure projector systems, automation/scheduling systems, and a reverse channel which provides data back to the headend from the theaters. Referring to FIG. 4, the third system is the Creator/Editor's System. This system, which allows authorized viewing and editing of cinema files by creators and editors, includes many of the same subsystems as the Theater System. However, the Creator/Editor's System further includes subsystems which provide capability for editing and baseband processing of cinema files at remote locations, and allows transmission of cinema files back to the headend.

A. Headend System

1. Baseband Processing and Storacie of Digitized Cinema Files

The present invention utilizes the existing film capture production process up through the completion of the original camera negative. The first step is to input the negative into a high resolution film scanner which digitizes the negative picture element (pixel) by picture element. This digitization retains all of the information of the original camera negative, so that the digital representation can be used for archiving and multi-generation editing. The present invention accommodates all the various film formats and aspect ratios, including but not limited to 8 millimeter, 16 mm, and 35 mm film formats, and 1.33,1.37, 1.66, and 1.85 aspect ratios.

The digitized original camera negative file is then compressed utilizing a lossless compression technology. This ensures that the motion picture image can be efficiently archived without loss of any information. By way of example but not of limitation, if a compression ratio of 6 to 10 is used for this lossless compression, then 0.3 to 0.5 terabytes are required per hour of movie for storage with archival quality.

In a preferred version of the present invention, the original camera negative film is converted into a digitized format. Because of the ever present problem of piracy, the digital motion picture image file is encrypted before transfer to the digital electronic cinema headend. The digital motion picture image file is decrypted before being processed by the lossless compressor.

Audio may be recorded in analog or digital format, and is available from magnetic tape masters or optical or magnetic tracks on the film. Sound tracks may recorded for each speaker of multi-speaker theatrical systems. For example, in a preferred version of the present invention involving a 16 speaker theater system, capacity for 16 audio channels is allocated utilizing a 64 KHz sampling rate and a dynamic range of 20 bits per channel, that is, 1.28 mbps per channel. Thus, for 16 channels the real time transmission or storage requirement is 9.2 gigabytes per hour. To prevent piracy, security must be provided for analog audio masters and the digital audio masters. For that reason, the digital audio files are encrypted The audio archiving system in a preferred version of the present invention provides capacity for storage of multiple languages as required. For example, a multiplex theater exhibitor may have two screens, one with English audio, and a second with Spanish audio. Audio is normally archived uncompressed, as significant artifacts are created with even modest compression.

A file server controls the flow of files to and from the previously described elements as well as a Distribution Archiving Storage System. The file server includes the following functions:

1. Encryption of the lossless motion picture image file and the digitized audio file under direction of a Conditional Access System (described below), if required.
2. Management of storage of the motion picture image and audio files, together with all timing and program associated data, onto the archiving storage system.
3. Playback of the stored cinema files from the archiving storage system.
4. Decryption of the cinema files into lossless motion picture image and audio files.

The distribution archiving storage system stores a number of lossless motion picture image files and audio files and is able to playback on demand motion picture image and audio files. Safeguards such as 1:1 redundant fail safe protection can be included. Due to practical limitations on the amount of available storage capacity, at any given time the headend will only store in the distribution archiving storage system the cinema files to be distributed over a period of several weeks. Therefore, system design includes choosing a period of time in which each motion picture is to be archived at the headend, and a method for disposition of the file when the storage/distribution period ends.

A long-term archiving storage system is required by the motion picture industry to preserve original, contribution quality digital cinema files for use by future exhibitors or historians. A preferred version of the headend provides this capability. The long-term archiving storage system retains a copy of every digital electronic cinema motion picture image and audio file in the form of lossless compressed digital motion picture image files. All cinema files are stored, in encrypted form, in a fail safe storage system. To provide user access to the long-term archiving system, a Web page, for example, may be used as a user interface.

Upon retrieval from an archive, each motion picture image file is decompressed. Then, to facilitate distribution, lossy compression is used to provide a compression ratio of, for example, about 100:1, resulting in a compressed motion picture image file, which can be transmitted utilizing a much lower bandwidth then would otherwise be required without lossy compression.

The audio file is compressed utilizing, for example, DTS or MPEG Advanced Audio Coding (AAC) algorithm. The AAC algorithm provides efficient coding of monaural, stereo, and multichannel audio. The AAC can achieve reduction of audio files by a factor of 10:1.

In addition to the audio and motion picture image files, program-associated data and conditional access information, such as authorizations and messages to and from exhibitors and users, are either retrieved from the archiving system, or received from the distribution management system (described below).

After lossy compression, the motion picture image, audio, and data are then forwarded to the multiplexor which packetizes the incoming bit streams, and forms the packets into a serial multiplexed bitstream similar to, for example, the format of the System Layer of MPEG2. Each packet in the bitstream is then encrypted with a very powerful encryption algorithm. One technical approach to encryption is to utilize an encryption technology such as triple Data Encryption Standard (Triple DES) which uses a 112 bit key. An alternate approach is to use the Digital Video Broadcast (DVB) standard, which has been widely adopted. The Conditional Access System provides the instructions to the conditional access engine in the multiplexor/encryptor, which in turn enables the encryptor. The output of the multiplexor/encryptor is a secure bit stream, which is then input to the modulator/tuner.

2. Radio Frequency Transmission

The specifications of the modulator/tuner depend upon the transmission media chosen for distribution. One preferred version of the present invention uses satellite transmission for distribution to theaters. The following discussion is based upon this selection. However, alternative transmission media such as microwave, coaxial cable, and fiberoptic cable can be used for delivery of digital electronic cinema to classes of users.

At present, channel coding for satellite transmission of digital TV utilizes QPSK modulation, with rate ½ to rate ⅚ convolutional coding and Reed Solomon forward error correction. With these technologies the net bits per symbol is about 1.7, and the coding gain is about 4.5 dB, resulting in a threshold Eb/No at the receiver demodulator of about 5.5 dB. Recent advances in coding technology have led to an effort by many companies to bring into production a 16PSK modulation, with rate ¾ trellis code, thus achieving a net of 3 bits per symbol, and a coding gain of about 6.6 dB. This new modulator design is predicted to achieve equivalent receiver threshold of about 5.5 dB, but with over a one-third reduction in occupied bandwidth. Thus a 96 Mbps modulator will require about 32 MHz of bandwidth. Other channel coding techniques, well-known to those skilled in the art, can be used in the present invention.

The tuner may provide, for example, a L Band output having a carrier which is chosen to provide the authorized satellite transponder frequency after upconversion by the upconverter module (which follows the tuner). The carrier output frequency is electronically programmable, and is assigned by the broadcast operations module of a Distribution Management System (described below).

If a satellite transmission medium is used, the satellite uplink transmission system may comprise an upconverter, an interfacility link (between the modulator/tuner and the upconverter), a power amplifier, and an uplink antenna. It is desirable to use small antenna "dishes" at the theaters to avoid governmental regulation problems, security issues, and construction and antenna costs associated with large dishes. For these reasons, as well as C band frequency congestion problems, a preferred version of the present invention uses Ku band link implementation, which allows use of smaller dishes. However, due to the higher hourly transponder costs and significantly higher rain attenuation of Ku band links, other versions of the present invention may use lower frequency links. The antenna dish sizes for the uplink and the downlink are chosen based on the link reliability objective, and the power output of the chosen high power amplifier. It is expected the antennas will be sized for a reliability of 99.99% availability, resulting in a Ku band uplink antenna size of about 7 meters in diameter, and a Ku band downlink antenna size of about 1.2 meters.

In a Ku band uplink system, for example, an incoming L band signal from the modulator/tuner, which is within the frequency band 950 to 1450 MHz, is upconverted to the frequency band 14.0 to 14.5 GHz. The output of the upconverter is amplified by a Ku band power amplifier. A four port orthomode transducer is then used in conjunction with a switching system to provide uplink capability in either right or left hand polarization, together with the ability to receive the downlink signal for signal monitoring and performance verification.

Uplink signal power level is electronically controlled to provide automatic modification of uplink power during uplink rain fades. The objective is to keep the uplink signal strength constant at the input to the satellite transponder receiver. If the uplink signal uses an entire transponder, a transponder with automatic level control is preferred. The electronics modules of the uplink system preferably have 1:1 redundancy and automatically switchover should a failure occur, as directed by a monitor and control system.

In a preferred version of the present invention, an inbound data channel enables either the headend to receive responses to inquiries from the exhibitor, such as for playback information, security status, or theater module performance status. The headend also can receive confirmation of inputted data such as authorizations, entitlement modifications, or financial or administrative messages. Additionally, the exhibitor can use the data link to make inquiries of all kinds, update information, provide statistical information, and to pay for services electronically. The inbound data lines provide the headend with the ability to receive data and messages from not only the exhibitors, but also the studios, suppliers, financial institutions, and other entities which need technical and/or administrative data interfaces with the headend.

Another inbound channel may be provided for reception of cinema files from a Creator/Editor's System (described below), which allows authorized viewing and editing of cinema files by creators and editors. The Creator/Editor's System includes subsystems which provide capability for editing and baseband processing of cinema files at remote locations, and allows transmission of cinema files back to the headend. After cinema files are received by the Headend System from the Creator/Editor's System, they are generally stored in a Long-Term Archiving Storage System.

Sensitive data sent to the headend may be encrypted so that encrypted data, as well as data which has not been encrypted, can be routed to its destination address, acknowledged if applicable, and stored if appropriate. An internal router is used to forward data to applicable outbound transmission lines as required. The routing of technical and administrative data is accomplished via a local area network (LAN) with appropriate security safeguards, such as multi-level passwords and firewalls to prevent unauthorized access.

3. Management of Cinema Files and Databases

Access to the electronic cinema program files is controlled by a Conditional Access System (CAS) for the following reasons:

1. To ensure that only authorized playback of the files occurs.
2. To ensure that the terms and conditions of the contracts between distributor, service provider, and exhibitor are enforced.
3. To ensure that the revenues derived from the playback of the files are retrieved for the distributor and the service provider.
4. To prevent piracy of the files.
5. To ensure that the files in storage media cannot be accessed without authorization and accountability.
6. To ensure that any other sensitive data or files cannot be accessed, or altered, without authorization and accountability.

The CAS manages the flow of entitlements (authorization information), and other information such as motion picture, audio, and data bit streams to their destinations (for example, the theater receiver-decoder, storage, and playback systems, the archiving storage systems, and through the encryptors and decryptors). Entitlements originate in the Distribution Management System (DMS), which contains a database on all the deal memos between distributors, service providers, exhibitors, and other subscribers, and contract information on any other services including any conditional access requirements. The CAS also provides a very high level of both physical and electronic system security to regulate the viewing of files at the destination, and to eliminate the ability of pirates to intercept files and view their contents.

The CAS comprises four subsystem which provide control, security, and distribution of cinema and data files. These subsystems are:

1. Entitlement Management Center (EMC): receives the exhibitor/subscriber data and cinema/data file access data (CAD) from the DMS. The EMC constructs Entitlement Management Messages (ENM from this received data.
2. Entitlement Controller (EC): generates the following data packets which provide entitlement instructions:
   (a) An Entitlement Control Message (ECM) is created by combining the cinema/data file access data with an authentication signature;
   (b) An authorizing key (Control Word) is also created for each cinema/data file, and delivered to the encryptor. The Control Word governs how the file will be encrypted and later decrypted at the receiver-decoder. It is not broadcast to the receiver decoder.
   (c) In addition to creating the above data packets, the EC forwards the EMM to the receiver-decoder.
3. Conditional Access Module (CAM): resides in the receiver-decoder, and controls access to the incoming files. This module may, for example, consist of an ISO Smart Card reader and a Smart card. The Smart Card reader manages the exchange of information between the Smart Card and the receiver-decoder. Upon receipt of an entitlement message, the Smart Card reader verifies that the entitlement message is authentic, and then compares the entitlement data in the received message with the entitlement data resident in the Smart Card. If they match, the appropriate Control Word is generated to be used by the decryptor to unscramble the cinema/data file.

4. Callback capability: also may be provided to allow the receiver-decoder to call the EMC, or the EMC to call the receiver-decoder. The EMC can receive data back from the exhibitor/subscriber Smart Card. This data includes exhibitor/subscriber identification, stored transactional information such as number of playbacks, and equipment status reports. The EMC may also call the receiver-decoder to deliver new data to the Smart Card.

A Distribution Management System (DMS) manages the distribution of the cinema and data files, and the flow of traffic and timely operation of the various subsystems of the headend and the theater systems. Its major tasks include:

1. Keeping a current and historical record of studio distributors, independent studios, independent distributors, and exhibitors.
2. Keeping a record of deal memos, including a breakdown of all contract requirements imposed on the service provider and the exhibitor.
3. Providing a Billing System which will provide financial analysis and statements related to the financial terms of the individual deal memos.
4. Generating conditional access information which is delivered to the CAS for further processing into Entitlement Management Messages, which are used to enable the decryptor in the receiver-decoder.
5. Enabling the release of files from the Long Term Archiving Storage System, including providing authorization information to the CAS, and providing instructions to the Long Term Archiving Storage System to playback files, or portions thereof.
6. Providing a Traffic/Scheduling System which provides scheduling information to all Headend and Theater subsystems which must conduct timed operations. This system also receives feedback from the Theater systems, for example, as played information, requests to reschedule playback, and other requests which require initiating new entitlement messages.
7. Providing an Automation System which receives the traffic/scheduling information and then actuates the operational equipment as scheduled. Upon initiation and completion of these tasks, the Automation System provides timely reports back to the DMS.
8. Providing a Customer Service organization which provides a customer-friendly interface, particularly for assistance of customers with trouble-shooting problems and resolution of customer complaints.
9. Providing interactive data exchange between the DMS and the other software systems.

The DMS contains sensitive data which must be protected from unauthorized access. Therefore, the system includes multi-level password protection, firewalls at data I/O ports, and sufficient redundancy of the hardware to prevent loss of records.

A Cinema File Management System (CFMS) provides a database of all the cinema files in the Headend, and at Theater locations. A database record is created for each cinema file, with a separate record for each motion picture image, audio, and associated data file. The record is expanded and updated each time a cinema file is processed at the headend to include its status, location, copies if any, type of processed file, and modifications. A separate database is kept of all cinema files which are placed in the Long-Term Archiving Storage System. This database includes historical information on who, why, when, and what was accessed, and the authorization information. The CFMS also keeps individual records of cinema files stored in the Theater storage systems and the purging thereof. The CFMS provides status reports on a routine basis, and exception reports on an urgent basis when certain operations, such as purging, fail to occur as scheduled. These reports are provided to the DMS.

A Data File Management System (DFMS) serves a function equivalent to that of the CFMS, except the files which are managed are non-cinema files. These files could include data such as program associated files, data describing a particular cinema, its production, and other historical data concerning a cinema file which might interest an exhibitor or the cinema audience. The data could include subtitles, teletext, special interest information, and a myriad of other possible data transfers between the service provider, distributor, and exhibitor. In some cases the data is encrypted, in other cases it is not. The DFMS keeps records of all the data files, their location, and historical information on the processing, access and disposition of the data files.

A Web Page Management System (WPMS) provides an up-to-date web page, which can be accessed via the Internet by external users with authority to view a file stored in the Long-Term Archiving Storage System. The files stored in the archive are encrypted and therefore security arrangements are highly stringent. The WPMS provides the user with the ability to do a data base search to identify a file of interest, and obtain a brief abstract and other program associated data. The WPMS provides authorization to users to allow viewing of files with proper security safeguards. For example, an editor could be sent an encrypted copy of the file, which could be read by the editor's personal receiver-decoder upon authorization by the CAS. In this example, the DMS would provide the user entitlement message to the CAS. The WPMS also provides administrative messages to Customers and Vendors, and provides public relations messages to all other interested parties.

B. Theater System

1. Transmission Line Interfaces

Cinema and data files can be delivered by a satellite communication link, or terrestrial communication links such as microwave, coaxial cable, or fiberoptic cable. If, for example, a satellite transmission medium is used, the earth station transmission system may comprise a downconverter, an interfacility link (between the downconverter and the demodulator/tuner), and a downlink antenna.

In a preferred version of the present invention, a Ku band link is utilized with a small antenna (dish) mounted on the roof of theaters. The dish size is a function of the desired reliability of the transmission link from the headend to the theater. For example, for programs which are delivered only for storage on the theater storage system, link outage probability of three hours a month may be reasonable. However, for real-time transmission and presentation, a link outage during a performance would be unacceptable, and thus it would be more acceptable to have a probability of an outage of less than 30 minutes during a month. In general, dish size is in the range of 1.0 meter to 2.4 meters in diameter.

The received signal of such a link is collected by the antenna and forwarded to a low noise downconverter which converts the Ku band signal to a signal in the 950 to 1450 MHz band. The low noise downconverter has sufficient gain to allow an interfacility link coaxial cable to be run from the antenna location to the indoor demodulator/tuner of the indoor receiver-decoder.

An outbound data channel (reverse channel) is provided so that two-way data communications can be established between the headend and the theater system. An outbound channel can be used for many purposes including sending inquiries, playback information, security status, theater module performance, confirmations, electronic payments, and e-mail. Data packets within the bit stream of an outbound data channel may be encrypted in accordance with instructions from the CAS.

The outbound data channel can utilize satellite or terrestrial transmission media. If, for example, satellite transmission is utilized, then a low power uplink transmitter is provided. This uplink transmitter is interfaced to a transmit port of the antenna. In a preferred version, the uplink transmitter includes a medium power amplifier (0.5 to 2.0 watts), an upconverter from the frequency band 950 to 450 MHz to the satellite receive transponder frequency, and a modulator/tuner which receives outbound (reverse) data from the theater system and provides a radio frequency carrier, which is chosen to provide the authorized satellite transponder frequency after upconversion by the upconverter module (which follows the tuner). The carrier output frequency is electronically programmable, and is assigned by the broadcast operations module of the DMS.

2. Receiver-Decoder

A receiver-decoder comprises a tuner/demodulator, a system demultiplexor, microprocessor/controller, and a Conditional Access Module (CAM).

In a system utilizing satellite transmission, for example, transmission may be at 96 Mbps with 16PSK modulation and a ¾ rate trellis code. This provides a net of three bits per symbol at a symbol rate of 24 megasymbols per second, and a coding gain of 6.6 dB. Other channel coding techniques, well-known to those skilled in the art, can be used in the present invention.

In a preferred version of the receiver-decoder operating in L band, a L band tuner of the Tuner/Demodulator is tuned to a specific L band frequency associated with a specific downlink satellite transponder. The output of the tuner is demodulated to a baseband digital bit stream, and then the FEC is removed. The resultant bit stream is an encrypted, multiplexed bit stream containing audio, motion picture image, and data information.

A system demultiplexor then separates the bit stream into its audio, motion picture image, and data bit streams. The resultant bit streams are then forwarded to the appropriate ports or interfaces under direction of a microprocessor/controller.

A microprocessor/controller provides instructions which direct the activities of all the I/O ports, and does all the housekeeping tasks necessary to provide a functioning receiver-decoder. It may also compare a user profile stored in receiver-decoder memory with an incoming data message describing a specific user profile, and either accept or reject the incoming bit stream. If the incoming bit stream is accepted as valid for a particular receiver-decoder, then entitlement information is passed to the Conditional Access Module for further processing. In addition, the microprocessor/controller accesses the receiver-decoder memory which may contain instructions and messages such as error messages. These messages can be displayed locally or forwarded to the headend via the reverse channel.

A CAM receives EMM and ECM data from the headend, verifies the authenticity of the data, compares the data with stored information, for example, in a Smart Card, and, if validity is established, generates a key word necessary to enable the decryptor. In a preferred version of the present invention, the key word is generated on a packet by packet basis. In this case, each location which has an encryptor and/or a decryptor has an associated receiver-decoder and a CAM. These locations include the Secure Projector System, the Speaker System, and the User Data Channel. The key word is transferred to the encryptor/decryptor in a secure environment. For example, removal of the Smart Card or the CAM from the receiver-decoder disables the receiver-decoder.

3. Storace Playback System

Each current authorized movie is stored in compressed and encrypted form in a storage media. In a preferred version of the present invention, ganged rewritable non-removable Raid hard drives are used. Other storage media, well-known to those skilled in the art, can be used in the present invention. The selection of the storage media is predicated not only on capacity, redundancy, I/O ports, access time, throughput, and file transfer rate, but also on the security needs of the system.

For example, the storage media may have over 150 gigabytes of storage that can playback at a data rate of at least 8 megabytes per second. For theaters with multiple screens, the storage media is sized to provide storage for all cinema files.

An automation system (described below) delivers each cinema file to a secure projector system at a time specified and authorized by the CAS. Since movies are often transferred to different screens within a given theater based upon audience size, the DMS manages such transfers upon verification and authorization by local theater-generated instructions. When a particular cinema file is projected for the last time, the storage media is automatically erased and another authorized cinema file is stored in its place.

4. Secure Projector System

The secure projector system comprises the following subsystems:

1. demultiplexor (demux)/motion picture image decryptor;
2. output port to forward encrypted audio to an audio distribution controller;
3. motion picture image decompressor;
4. visual projector; and
5. interface with a CAM (there may be a separate CAM for each subsystem that either encrypts, decrypts, stores, or forwards encrypted or entitlement data).

In a preferred version, the projector system is designed so that decryption of the motion picture image takes place within the projector with sufficient security to prevent interception of the decrypted motion picture image file. It is a sealed assembly which if opened not only causes the loss of the stored cinema file, but also makes the projector inoperable until serviced by an authorized field service technician.

The Demux/Motion Picture Decryptor receives encrypted files from local storage, separates motion picture image, audio, and data files into separate bit streams, then decrypts them and provides the outputs to the data, audio and motion picture image decompression units.

Separate motion picture image and audio decompression units are employed. In such systems, each decompression unit has sufficient programmability so that a variant of ISOMPEG2 coding technology can be used at present, while allowing decompression units to be upgraded to ISOMPEG4 and beyond in the future. The ISOMPEG2 System transport layer may be employed to ensure that appropriate synchronization is maintained between the audio and the motion picture image.

Advanced Audio Coding(AAC), ISOMPEG4 Part 7, which currently provides the most efficient 5.1 channel audio available, may be used as an audio coding algorithm, although any other audio coding algorithms can be accommodated. It is anticipated that in many theaters, more than five channels of audio will be required, requiring multiple channels of AAC in multichannel or stereo configurations. Other motion picture and audio coding algorithms, well-known to those skilled in the art, can be used in the present invention.

Figure 3:
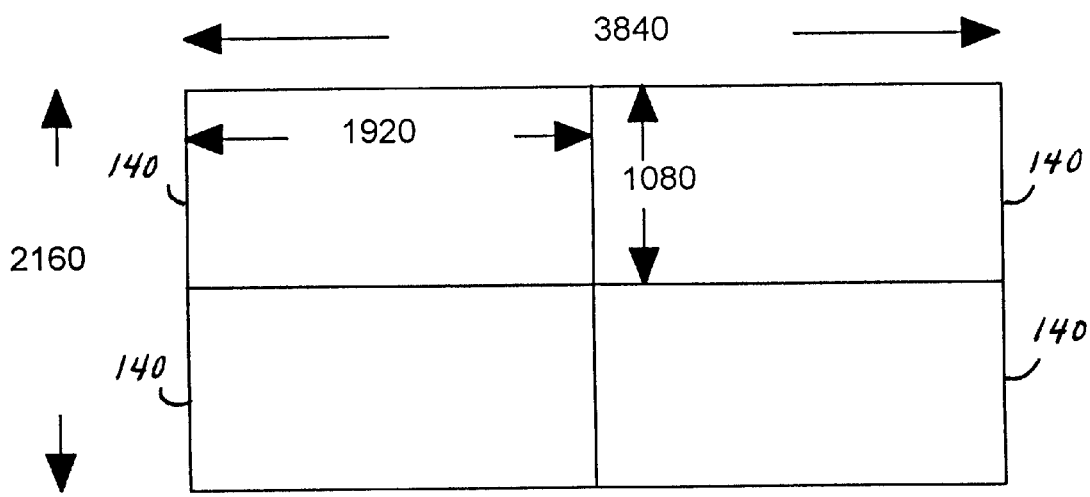
FIG. 3 is a diagram of a preferred version of a tiling arrangement for a projector system embodying the present invention.

The projector is preferably designed to meet high quality projection requirements for exhibition of 35 mm (or other) films. These requirements may include display of approximately 8 million pixels for each of 24 frames per second, brightness for a 70 foot diagonal screen (approximately 6,000 lumens), and provisions to discourage camcorder piracy. A projector technology which can meet these requirements is liquid crystal-based Image Light Amplifiers (ILA). Other projection technologies, such as Digital Mirror Devices (DMD), well-known to those skilled in the art, can be used in the present invention. To achieve the feel of film, the images are displayed one frame at a time (as opposed to video which writes one pixel at a time sequentially). A two stage ILA device may be used. The output stage is similar to existing ILA devices that can produce brightness levels of over 6,000 lumens. In a preferred version, the writing stage of the ILA utilizes transmissive LCD panels which provide the writing function. Thin, single crystal LCD tiles typically are used. By way of example, these are available in 1080 by 1920 pixels format. As is shown in FIG. 3, four of these tiles can be used to provide a resolution of 2160 by 3840 pixels.

In this example, four LCD tiles are imaged onto the output stage of the ILA, which serves as an optical low pass filter that eliminates seams between the tiles in the output or observation space. Thus, no cracks are visible to the observer. An embodiment of such tiling technology is described in D. Mead, U.S. Pat. No. 5,555,035, incorporated by reference herein. Transmnissive LCDs are preferably backlit by a light source which is optically filtered to create the correct wavelengths for the ILA photoconductive layer. Image data is read into the LCDs before they are illuminated by the light source. The frame rate of the projector can be varied pseudorandomly to inhibit camcorder piracy. This is described in D. Mead, U.S. Pat. No. 5,680,454, incorporated by reference herein. Other projector technologies, well-known to those skilled in the art, can be used in the present invention.

A receiver-decoder and an associated CAM may be provided within theaters at each location where decryption takes place (the Secure Projection System, the Speaker Systems, and the User Data System). The receiver-decoder forwards entitlement messages which are particular to each CAM, which then generates the key word necessary for decryption.

5. Other Theater Elements

In theaters, the screen is the display for the cinema. The size, aspect ratio, and the reflectivity of the screen must conform with the projector output characteristics to provide an acceptable theater presentation. Screen specification standards are established to provide assurance of reasonable quality control.

An Audio Distribution Controller of a preferred version of the present invention provides an encrypted digital output which is transmitted to each speaker system. Other audio distribution technologies, well-known to those skilled in the art, can be used in the present invention.

The transmitted encrypted audio signal is received by the speakers in the theater. The speakers are physically mounted to provide a direct line of sight from the secure projector system to the speaker systems. In the theater audio system, each speaker system has an internal speaker, a receiver-decoder, a CAM, a decryptor, and an audio decompression unit which are physically secure to prevent piracy. The decryptor only decodes audio packets directed to its associated speaker.

6. Automation/Schedulina System

Within the bit stream provided by the Headend to a specific theater is a playback schedule. This schedule defines the authorized playback times for each cinema file and for each screen in the theater. The automation/scheduling system schedules these playbacks, and provides the necessary machine control to automatically play the cinemas at the scheduled times. It includes the scheduling and playout of all trailers.

A theater operator interface provides the operator with the ability to modify the schedule, such as changing play times, and which screens are showing which cinemas. Such changes require notification of the headend. Changes which do not violate contractual terms are automatic, requiring only a change in the distribution records. Changes which modify the terms of an existing contract between Exhibitor, Distributor, and Service Provider are verified and authorized by the DMS once accepted by the parties to the contract. This interface also may provide a facility for allowing theater operators to insert locally-generated materials such as advertisements for local businesses.

7. Reverse Channel

A reverse channel provides data back to the headend and the studio-distributor from the theater. The data includes status information, as played information (actual times of playback), purges (erasure of cinema files), trouble reports and error messages, diagnostic information, and other messages related to the health and welfare of the theater system. The reverse channel also may be used for administrative and financial information. Since the reverse channel provides the theater with a two-way data capability (utilizing the forward data transmission capability of headend transmission system), interactive data applications can be utilized to provide interactive experiences to theater audiences.

C. Creator/Editor's System

The creative process involved in producing a cinema is a collaborative process between creators, editors and film processors. Once the original camera negative is converted to a lossless digital file, editing and review is simplified by utilizing powerful computer editing systems. As a result, creators and editors require access to the long term archival storage system so that they can retrieve specific files, perform editing and review functions, and then place an authorized amended version of the cinema file back in storage. Thus, a system must be provided to allow authorized viewing and editing of a cinema file by creators and editors. The requirement for this system adds additional security and distribution management requirements to the overall system architecture.

As is shown in FIG. 4, many of the subsystems in the Creator/Editor's System are similar to those of the Theater System. The Creator/Editor's System comprises the following subsystems:

1. Transmission Line Interface
2. Tuner/Demodulator
3. Receiver-Decoder comprising a System Demux, a Microcomputer, Local Memory, a User Profile, a Reverse Channel.

4. User Storage/Playback System
5. Reverse Channel Transmission Line Interface.
6. Demux/Motion Picture Decryptor
7. Motion Picture Decompressor
8. Audio Distribution/Decryptor
9. Conditional Access Module
10. Interface with Editor's Workstation
11. Motion Picture Compressor
12. Multiplex/Encryptor
13. Modulator-Tuner
14. Editor's Cinema File Management System, including interfaces with Headend CFMS Only the subsystems which are significantly different from those of the Theater System are described in this Section. In particular, the following subsystems are described below: User Storage/Playback System, Motion Picture Decompressor, Interface with Editor's Workstation, Motion Picture Compressor, and Editor's Cinema File Management System.

At the headend, a cinema file is retrieved from the long term archiving storage system, upon authorization by the CAS, to forward that specific file to a particular Creator/Editor's System. An encrypted cinema file is then transferred from the Headend System to the Creator/Editor's System via a transmission medium. The encrypted cinema file may be compressed utilizing either lossless or lossy compression technology as described previously. In addition, the audio file may be transferred uncompressed. The Storage/Playback System of the Creator/Editor's System receives the encrypted cinema file and stores the file. The cinema file may require up to 1.0 terabyte of storage for each hour of storage capacity, since the file may be delivered with lossless compression. The Storage/Playback System provides the ability to forward all or portions of a stored cinema file to the Editor's Workstation. In addition, the user can insert or replace specific portions of a cinema file utilizing the Editor's Cinema File Management System (ECFMS) (described below).

After the cinema file is retrieved from the Storage/Playback System and decrypted, it is decompressed. The decompressor recognizes whether the file is a lossless or lossy compressed file, and decompresses the file accordingly. The resultant output bitstream represents a motion picture with resolution of eight to twelve million pixel per frame.

A cinema file may be transferred to and from an Editor's Workstation under the direction of the Editor's Cinema File Management System. A transfer is made only after all security checks and authorizations are validated. The Editor's Workstation provides the ability to view the motion picture at full, or reduced resolution, and to make authorized modifications in the motion picture file. It may also provide the ability to review and edit the uncompressed audio file of the cinema.

When the work of the Editor is completed, and the edited file is to be returned to the Long-Term Archiving Storage System, then the replacement cinema file must be transferred to the headend under the direction of the Cinema File Management System of the headend. In a preferred version of the present invention, a replacement cinema file is compressed in the Creator/Editor's System using the lossless compression technology described previously. Cinema files may be transferred between Creator's and Editor's Systems which are not physically located in the same place. These transfers may be made utilizing the lossy compression technology described previously. Thus, for example, the compressor may have the ability to provide lossless or lossy compression as directed by the ECFMS.

The ECFMS provides a database of all the cinema files at a Creator/Editor's System location. A data base record is created for each cinema file, with a separate record for each motion picture, audio, and associated data file of the cinema. The record is expanded and updated each time the cinema file is processed in the Creator/Editor's System to include its status, location, copies if any, type of processed file, and modifications. The ECFMS provides status reports, requests for entitlements, and requests for file transfer to the CFMS. The CFMS schedules the transfer of cinema files, or portions thereof between the User Storage/Playback System and the Editor's Work Station. It may also schedule the transfer of cinema files or portions thereof between Creator/Editor's Systems. In addition, the ECFMS provides instructions to the Automation System of the Creator/Editor's System to activate machine control of subsystems, for example disk drives, on schedule.

A separate data base is kept of all cinema files which are removed or placed in the Long-Term Archiving Storage System. This data base includes historical information on who, why, when, and what was accessed, and the authorization information.

The ECFMS also keeps individual records of the Cinema files stored in the Creator/Editor's storage systems and the purging thereof. The ECFMS provides status reports on a routine basis, and exception reports on an urgent basis when certain operations, such as purging, fail to occur as scheduled. These reports are provided to the DMS.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

In the following claims, those claims which do not contain the words "means for" are not intended to be interpreted in accordance with 35 U.S.C. section 112, paragraph 6.

What is claimed is:

1. A system for delivery of digital electronic cinema to a plurality of users including theaters, comprising:

a headend system comprising a baseband processing system which receives analog cinema film as input, a storage system which receives digitized cinema files from the baseband processing system, a radio frequency transmission system which communicates cinema and data files to various users including theaters as radio frequency bit stream, and which further communicates data from said users, and a management system which controls transmission and storage of cinema and data files;

a theater system comprising transmission line interfaces at theaters designated to receive cinema and data files from the headend system, receiver-decoders which receive the radio frequency bit stream and produce decoded cinema and data files at baseband, a storage playback system which stores cinema and data files until needed, and a secure projector including a decryptor for playing back encrypted cinema files;

an editor's system which allows authorized viewing and editing of cinema files, wherein the editor's system provides capability for editing and baseband processing of cinema files at remote locations, and transmits edited cinema files back to the headend system.

2. The system of claim 1, wherein the editor's system comprises a second receiver-decoder which decompresses motion picture image files which were compressed using lossless or lossy compression algorithms, a high capacity storage playback system, and a workstation for reviewing and editing cinema files received from the headend system.

3. The system of claim 1, wherein the editor's system transmits edited cinema files back to the headend system utilizing a subsystem comprising a baseband processing system, a modulator/tuner, and a satellite uplink transmission system.

4. The system of claim 1, wherein edited cinema files transmitted by the editor's system are received by a headend subsystem comprising a satellite downlink system, a demodulator, a receiver-decoder, and stored in the storage archiving system.

5. A method for delivers of digital electronic cinema, comprising the steps of:

transferring a motion picture image to a digital signal in a digital format which is of substantially the same visual quality as the motion picture image in its original form; and transmitting the cinema in the digital format, wherein the cinema is received by a plurality of end users according to a security scheme, and the step of transmitting the cinema includes allowing authorized viewing and editing of cinema files by creators and editors at remote business locations.

* * * * *